United States Patent
Tan

(10) Patent No.: US 11,301,311 B2
(45) Date of Patent: Apr. 12, 2022

(54) MEMORY CONTROL METHOD, MEMORY STORAGE DEVICE, AND MEMORY CONTROL CIRCUIT UNIT

(71) Applicant: PHISON ELECTRONICS CORP., Miaoli (TW)

(72) Inventor: Chen Yap Tan, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/593,960

(22) Filed: Oct. 4, 2019

(65) Prior Publication Data
US 2021/0064449 A1   Mar. 4, 2021

(30) Foreign Application Priority Data

Aug. 28, 2019 (TW) ................................. 108130908

(51) Int. Cl.
G06F 7/02 (2006.01)
G06F 9/54 (2006.01)
G06F 9/50 (2006.01)
G06F 12/0862 (2016.01)

(52) U.S. Cl.
CPC ............ G06F 9/544 (2013.01); G06F 9/5016 (2013.01); G06F 12/0862 (2013.01); G06F 2209/5022 (2013.01); G06F 2212/7201 (2013.01)

(58) Field of Classification Search
CPC .... G06F 9/544; G06F 9/5016; G06F 12/0862; G06F 2209/5022; G06F 2212/7201
See application file for complete search history.

(56) References Cited

U.S. PATENT DOCUMENTS

| | | | |
|---|---|---|---|
| 8,819,390 B1* | 8/2014 | Sivasubramanian | ....................... G06F 9/3863 711/204 |
| 2007/0214325 A1* | 9/2007 | Sasamoto | ........... G06F 12/0862 711/137 |
| 2011/0161568 A1* | 6/2011 | Bruce | ................. G06F 12/0246 711/103 |
| 2013/0179632 A1* | 7/2013 | Ben-Shemesh | ..... G06F 12/0862 711/105 |
| 2014/0052928 A1* | 2/2014 | Shimoi | ............... G06F 12/0862 711/137 |
| 2017/0269834 A1* | 9/2017 | Liang | ...................... G06F 3/064 |
| 2019/0138445 A1* | 5/2019 | Lee | ..................... G06F 12/0246 |

(Continued)

FOREIGN PATENT DOCUMENTS

TW   201828035   8/2018

OTHER PUBLICATIONS

"Office Action of Taiwan Counterpart Application", dated Jun. 15, 2020, p. 1-p. 7.

*Primary Examiner* — Charles E Anya
*Assistant Examiner* — Abdou K Seye
(74) *Attorney, Agent, or Firm* — JCIPRNET

(57) ABSTRACT

A memory control method for a rewritable non-volatile memory module is provided according to embodiments of the disclosure. The method includes: receiving at least one first read command from a host system; and determining, according to a total data amount of to-be-read data indicated by the at least one first read command, whether to start a pre-read operation. The pre-read operation is configured to pre-read data stored in at least one first logical unit, and the first logical unit is mapped to at least one physical unit.

10 Claims, 8 Drawing Sheets

(56) References Cited

U.S. PATENT DOCUMENTS

| | | | |
|---|---|---|---|
| 2020/0004540 A1* | 1/2020 | Navon | G06F 12/0246 |
| 2020/0117460 A1* | 4/2020 | Jin | G06F 12/0862 |
| 2020/0117462 A1* | 4/2020 | Jin | G06F 9/3861 |
| 2021/0034539 A1* | 2/2021 | Roberts | G06F 12/0888 |

* cited by examiner

MEMORY CONTROL METHOD, MEMORY STORAGE DEVICE, AND MEMORY CONTROL CIRCUIT UNIT

CROSS-REFERENCE TO RELATED APPLICATION

This application claims the priority benefit of Taiwan application serial no. 108130908, filed on Aug. 28, 2019. The entirety of the above-mentioned patent application is hereby incorporated by reference herein and made a part of this specification.

BACKGROUND

1. Technology Field

The disclosure relates to memory control technologies, and in particular, to a memory control method, a memory storage device, and a memory control circuit unit.

2. Description of Related Art

Digital cameras, mobile phones, and MP3 players develop rapidly in recent years, and therefore, demands of consumers on storage media surge. Since a rewritable non-volatile memory module (for example, a flash memory) stores data in a non-volatile manner, consumes little power, is small in volume, and has no mechanical structure, etc., the rewritable non-volatile memory module is very suitable to be built into the various portable multimedia devices exemplified above.

Generally, in order to improve data reading efficiency of a memory storage device, during sequential reading, through a pre-read operation, a next to-be-accessed logical unit may be predicted and data stored in that logical unit may be pre-read. However, when a command sequence in which read commands are stored has a relatively large depth (that is, there are relatively more to-be-processed commands) and/or there is a large amount of to-be-processed data, pre-reading next piece of data using the pre-read operation may instead reduce the data reading efficiency of the memory storage device.

SUMMARY

The disclosure provides a memory control method, a memory storage device, and a memory control circuit unit, which can start a pre-read operation at an appropriate timing to effectively improve data reading efficiency of the memory storage device.

A memory control method for a rewritable non-volatile memory module is provided according to embodiments of the disclosure. The rewritable non-volatile memory module includes a plurality of physical units. The method includes: receiving at least one first read command from a host system; and determining, according to a total data amount of to-be-read data indicated by the at least one first read command, whether to start a pre-read operation. The pre-read operation is configured to pre-read data stored in at least one first logical unit, and the first logical unit is mapped to at least one physical unit.

A memory storage apparatus is further provided according to embodiments of the disclosure, including a connection interface unit, a rewritable non-volatile memory module, and a memory control circuit unit. The connection interface unit is coupled to a host system. The rewritable non-volatile memory module includes a plurality of physical units. The memory control circuit unit is coupled to the connection interface unit and the rewritable non-volatile memory module. The memory control circuit unit is configured to receive at least one first read command from the host system. The memory control circuit unit is further configured to determine, according to a total data amount of to-be-read data indicated by the at least one first read command, whether to start a pre-read operation. The pre-read operation is configured to pre-read data stored in at least one first logical unit, and the first logical unit is mapped to at least one physical unit.

A memory control circuit unit for controlling a rewritable non-volatile memory module is further provided according to embodiments of the disclosure. The rewritable non-volatile memory module includes a plurality of physical units. The memory control circuit unit includes a host interface, a memory interface, and a memory management circuit. The host interface is coupled to a host system. The memory interface is coupled to the rewritable non-volatile memory module. The memory management circuit coupled to the host interface and the memory interface. The memory management circuit is configured to receive at least one first read command from the host system. The memory management circuit is further configured to determine, according to a total data amount of to-be-read data indicated by the at least one first read command, whether to start a pre-read operation. The pre-read operation is configured to pre-read data stored in at least one first logical unit, and the first logical unit is mapped to at least one physical unit.

A memory control method for a rewritable non-volatile memory module is further provided according to embodiments of the disclosure. The rewritable non-volatile memory module includes a plurality of physical units. The method includes: receiving at least one first read command from a host system; and determining, according to depth information of a command sequence and information regarding a data length of the at least one first read command, whether to start a pre-read operation. The pre-read operation is configured to pre-read data stored in at least one first logical unit, and the first logical unit is mapped to at least one physical unit.

Based on the above, after the at least one first read command is received from the host system, it may be determined according to the total data amount of the to-be-read data indicated by the at least one first read command whether to start the pre-read operation. Therefore, the data reading efficiency of the memory storage device can be effectively improved.

In order to make the aforementioned and other objectives and advantages of the present invention comprehensible, embodiments accompanied with figures are described in detail below.

DESCRIPTION OF THE EMBODIMENTS

Figure 1:
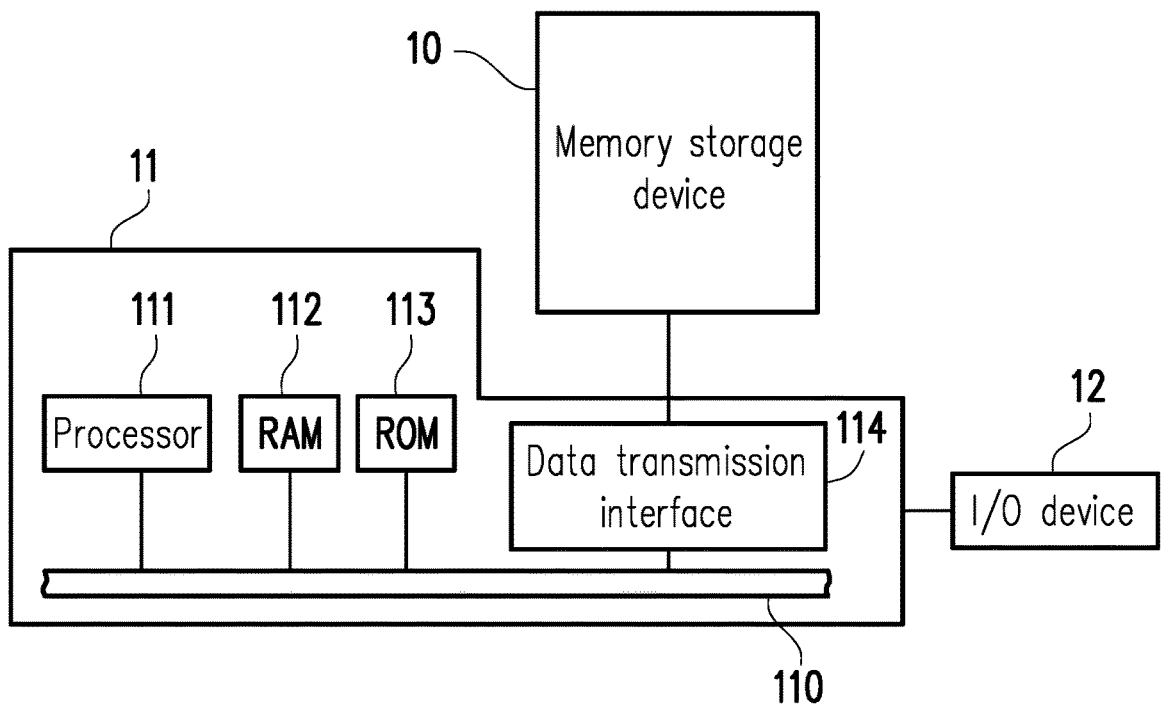
FIG. 1 is a schematic diagram illustrating a host system, a memory storage device and an I/O (input/output) device according to an exemplary embodiment of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
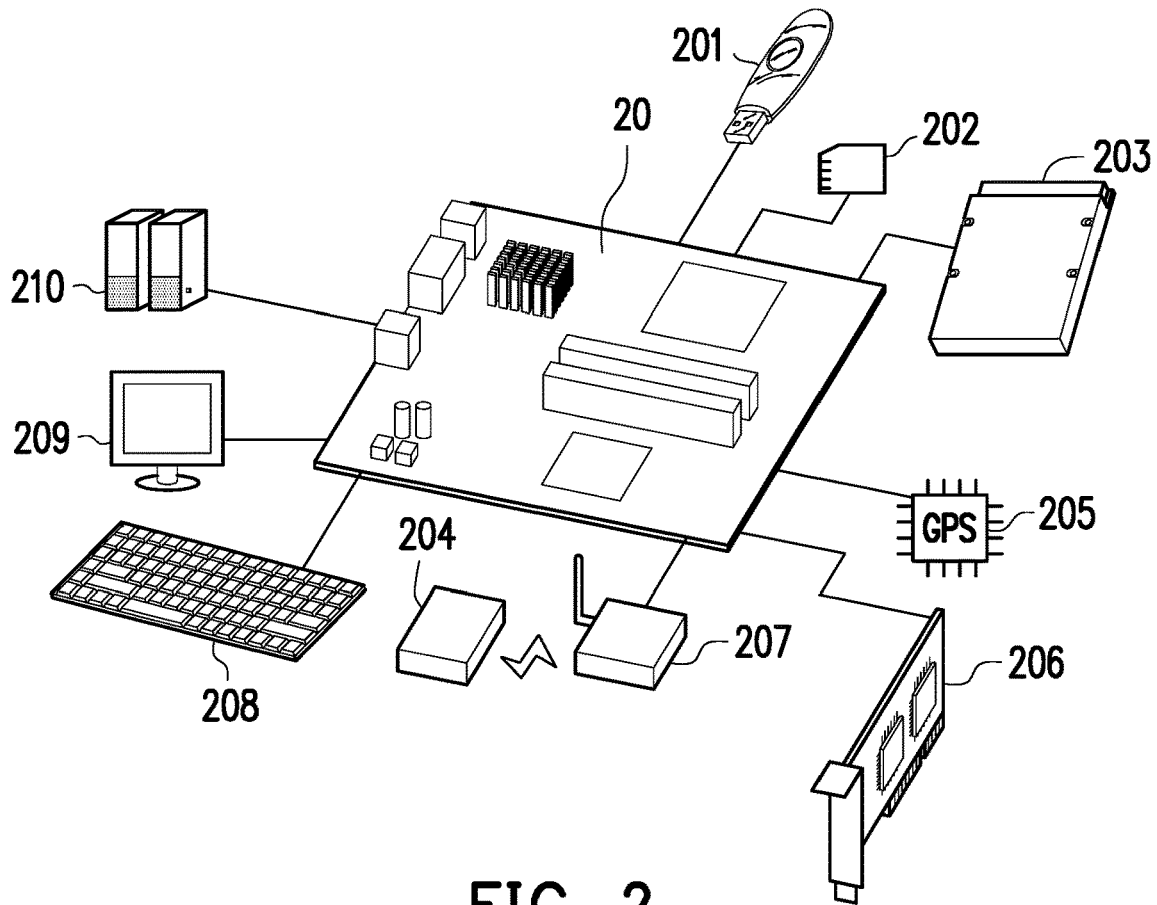
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
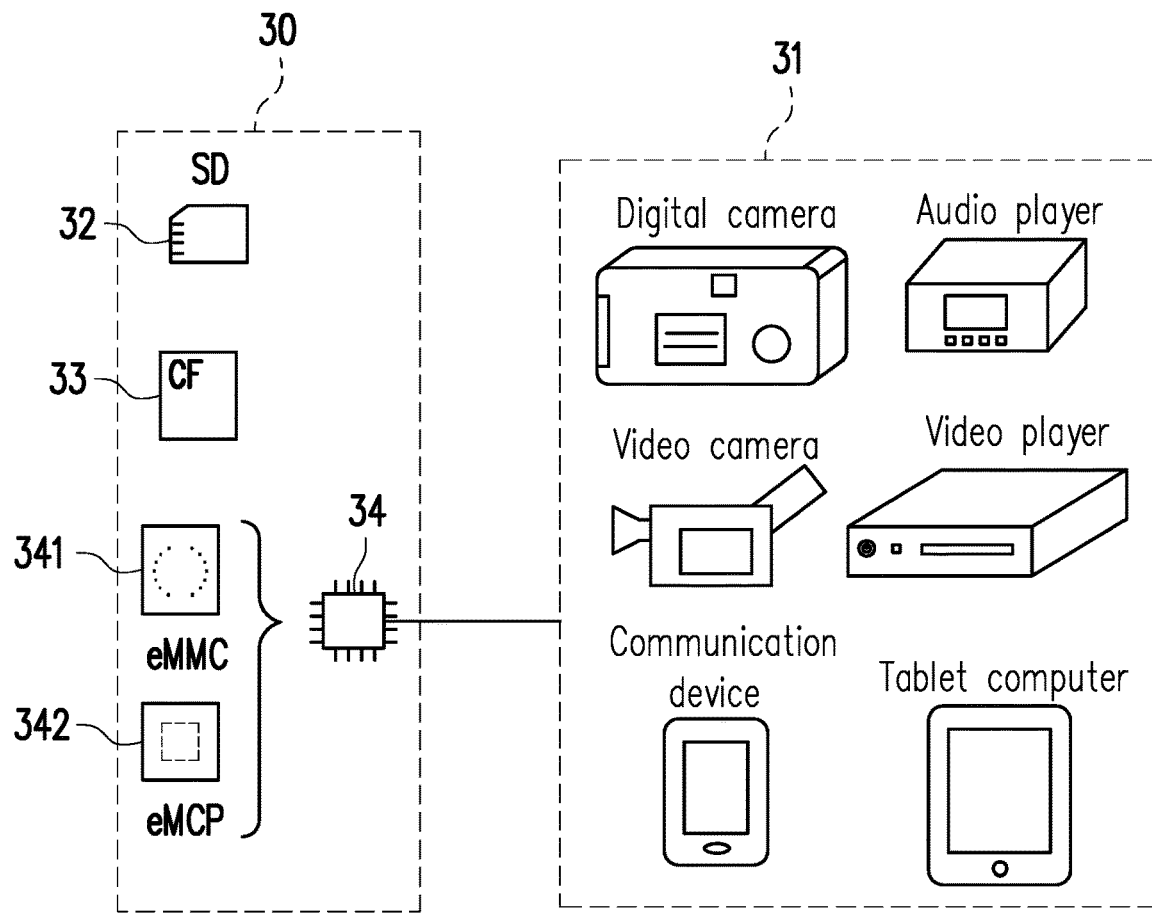
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
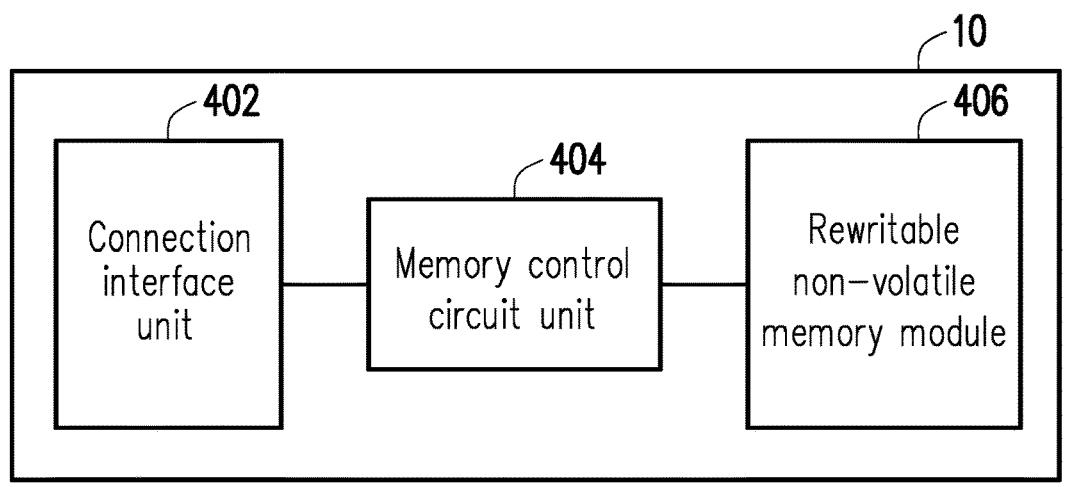
FIG. 4 is a schematic block diagram illustrating a memory storage device according to an exemplary embodiment of the disclosure.

FIG. 4 is a schematic block diagram illustrating a memory storage device according to an exemplary embodiment of the disclosure. Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In this exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 may be distributed outside of a chip containing the memory control circuit unit 404.

The memory control circuit unit 404 is configured to execute a plurality of logic gates or control commands which are implemented in a hardware form or in a firmware form and execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quad Level Cell) NAND flash memory module (i.e., a flash memory module capable of storing four bits in one memory cell), other flash memory modules or other memory modules with the same characteristics.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 can constitute a plurality of physical programming units, and the physical programming units can constitute a plurality of physical erasing units. Specifically, the memory cells on the same word line can constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, the physical programming unit can include a data bit area and a redundancy bit area. The data bit area contains multiple physical sectors configured to store user data, and the redundant bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
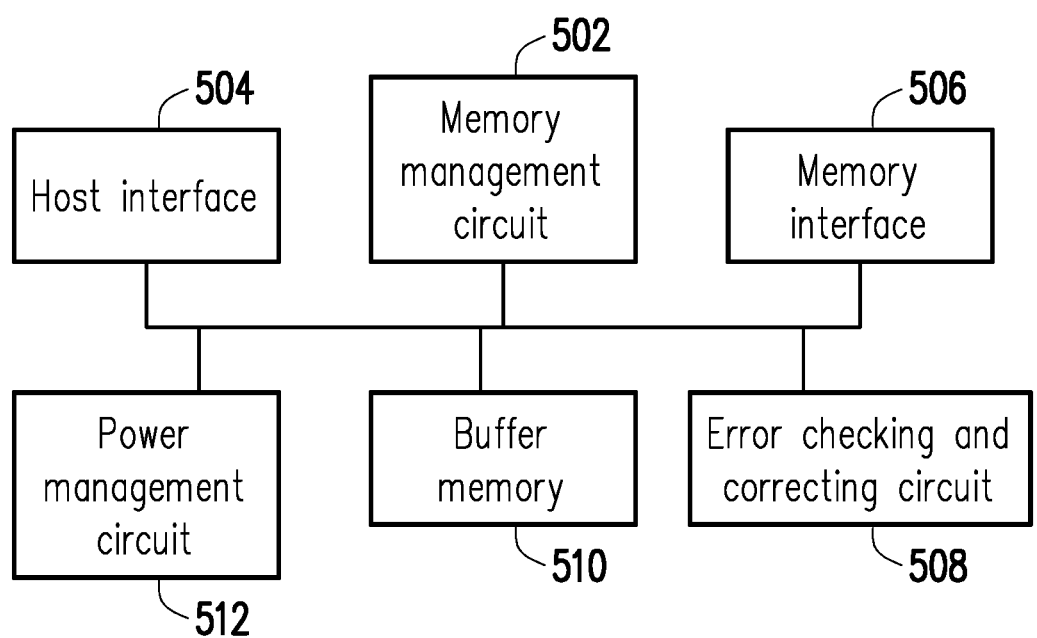
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure. Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to execute various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to execute operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to send a write command sequence to the rewritable non-volatile memory module 406 so as to write data into the rewritable non-volatile memory module 406. The memory reading circuit is configured to send a read command sequence to the rewritable non-volatile memory module 406 so as to read data from the rewritable non-volatile memory module 406. The memory erasing circuit is configured to send an erase command sequence to the rewritable non-volatile memory module 406 so as to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes and instructs the rewritable non-volatile memory module 406 to execute the corresponding operations, such as writing, reading and erasing. In an exemplary embodiment, the memory management circuit 502 may further send command sequences of other types to instruct the rewritable non-volatile memory module 406 to execute the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. However, it should be understood that the disclosure is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for executing various memory operations (e.g., changing read voltage levels or performing a garbage collection operation). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512. The error checking and correcting circuit 508 is coupled to the memory management circuit 502 and configured to execute an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In an exemplary embodiment, the rewritable non-volatile memory module 406 of FIG. 4 is also known as a flash memory module, the memory control circuit unit 404 is also known as a flash memory controller for controlling the flash memory module, and/or the memory management circuit 502 of FIG. 5 is also known as a flash memory management circuit.

Figure 6:
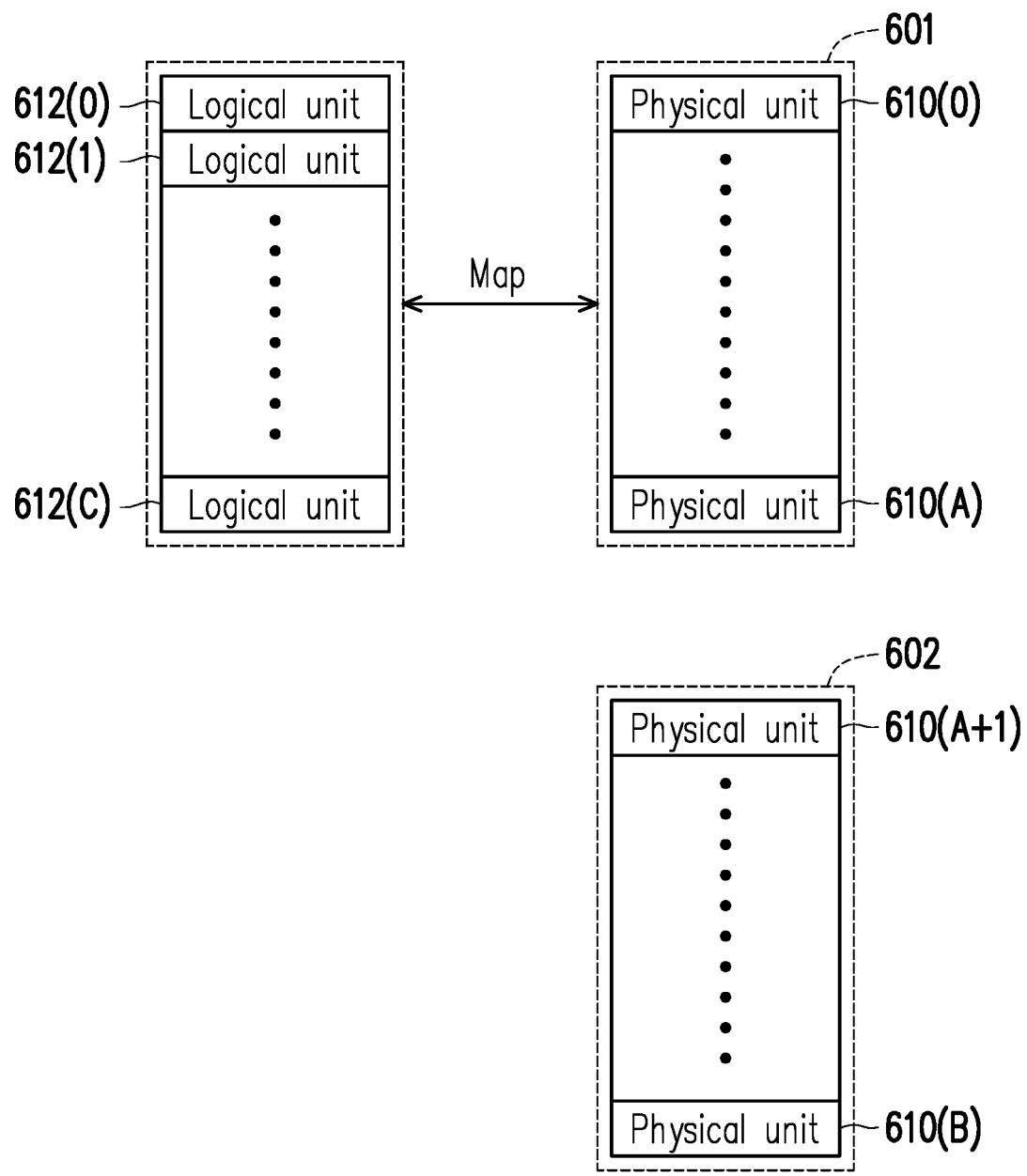
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure. Referring to FIG. 5 and FIG. 6, a memory management circuit 502 can logically group physical units 610(0) to 610(B) of the rewritable non-volatile memory module 406 into a storage area 601 and a replacement area 602. Physical units 610(0) to 610(A) in the storage area 601 are configured to store data, and physical units 610(A+1) to 610(B) in the replacement area 602 are configured to replace a damaged physical unit in the storage area 601. For example, if data read from a physical unit includes excessive errors that cannot be corrected, the physical unit is considered as the damaged physical unit. It should be noted that if there is no available physical unit in the replacement area 602, the memory management circuit 502 may declare that the memory storage device 10 is in a write protect state, and no data can be written into the memory storage device 10 any longer.

In this exemplary embodiment of the disclosure, each physical unit refers to one physical erasing unit. However, in another exemplary embodiment, the physical unit may also refer to one physical address, one physical programming unit, or consists of a plurality of sequential or non-sequential physical addresses. The memory management circuit 502 configures logical units 612(0) to 612(C) to map the physical units 610(0) to 610(A) in the storage area 601. In this exemplary embodiment of the disclosure, each logical unit refers to one logical address. However, in another exemplary embodiment, a logical unit may also refer to one logical programming unit, one logical erasing unit, or consists of a plurality of sequential or non-sequential logical addresses. In addition, each of the logical units 612(0) to 612(C) may be mapped to one or more physical units.

The memory management circuit 502 can record a mapping relationship (a.k.a. a logical-physical address mapping relationship) between the logical unit and the physical unit in at least one logical-physical address mapping table. When the host system 11 intends to read data from the memory storage device 10 or write data into the memory storage device 10, the memory management circuit 502 can perform a data access operation on the memory storage device 10 according to the logical-physical address mapping table.

In an exemplary embodiment, the memory management circuit 502 can receive at least one read command (a.k.a. a first read command) from the host system 11 in FIG. 1. To be read data indicated by the at least one first read command and/or the first read command may be stored in one or more command sequences in the buffer memory 510. The memory management circuit 502 may determine, according to a total data amount of to-be-read data indicated by the at least one first read command, whether to start a pre-read operation. It should be noted that the pre-read operation is configured to pre-read data stored in at least one logical unit (a.k.a. a first logical unit), and the first logical unit is mapped to at least one physical unit in the rewritable non-volatile memory module 406.

In a common read operation, the memory management circuit 502 instructs the rewritable non-volatile memory module 406 to read data from a physical unit mapped by a logical unit indicated by a read command. However, the pre-read operation is to guess a next possible to-be-read logical unit (or physical unit), to pre-read data from the guessed logical unit (or physical unit). In other words, the logical unit to which the data read using the pre-read operation belongs is not indicated by a read command that has been processed.

If the data pre-read using the pre-read operation is exactly to-be-read data indicated by a next read command, the pre-read data may be considered as target data. The target data can be directly processed (for example, transmitted to the host system 11 in FIG. 1) to effectively increase data reading efficiency for the rewritable non-volatile memory module 406. In addition, if the data pre-read using the pre-read operation is not the to-be-read data indicated by the next read command, the pre-read data may be considered as error data and is discarded.

In an exemplary embodiment, the memory management circuit 502 may compare the total data amount to a threshold, and determine, based on a comparison result, whether to start the pre-read operation. For example, the memory management circuit 502 may determine whether the total data amount is greater than a threshold. If the total data amount is greater than the threshold, the memory management circuit 502 may not start the pre-read operation. In other words, if the total data amount of the to-be-read data indicated by the first read command to be processed in the buffer memory 510 is greater than the threshold, the memory management circuit 502 may not start the pre-read operation.

Alternatively, if the total data amount is not greater than (for example, equal to or less than) the threshold, the memory management circuit 502 may start the pre-read operation. In other words, if the total data amount of the to-be-read data indicated by the first read command to be processed in the buffer memory 510 is not greater than the threshold, the memory management circuit 502 may start the pre-read operation. After the pre-read operation is started, the memory management circuit 502 may instruct the rewritable non-volatile memory module 406 to pre-read data from one or more physical units mapped by the guessed logical unit.

It is noted that in the following description, some terms may be replaced with corresponding abbreviations for ease of reading (see Table 1).

TABLE 1

| | |
|---|---|
| memory management circuit | MMC |
| rewritable non-volatile memory module | RNVM module |
| sequential read operation | SRO |
| logical unit | LU |

Figure 7:
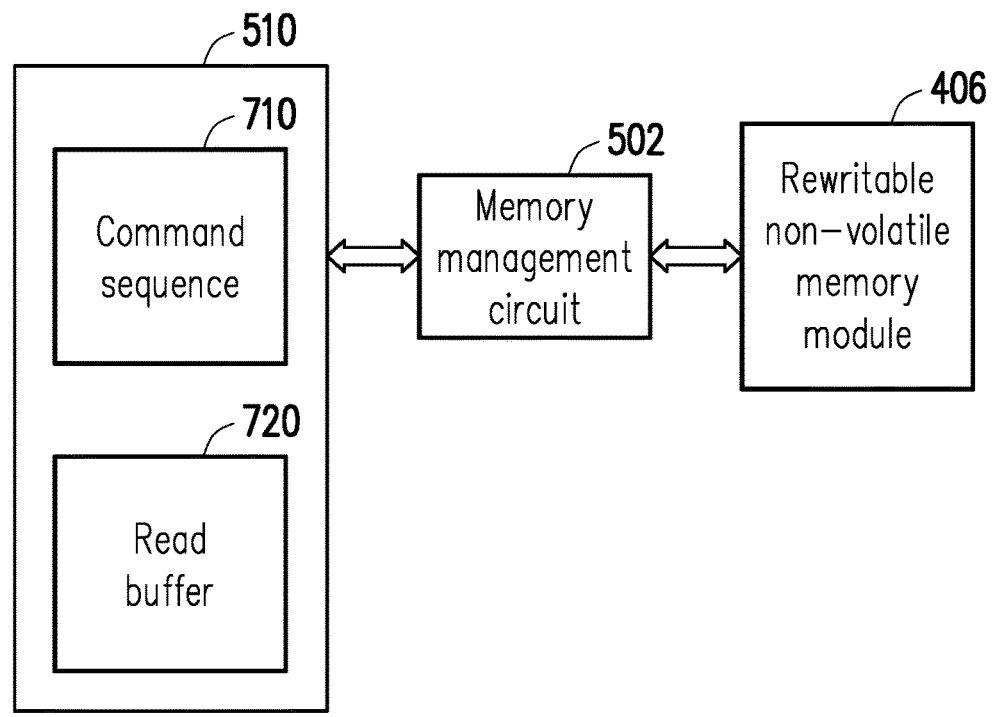
FIG. 7 is a schematic diagram illustrating management of a buffer memory according to an exemplary embodiment of the disclosure.

FIG. 7 is a schematic diagram illustrating management of a buffer memory according to an exemplary embodiment of the disclosure. Referring to FIG. 7, in an exemplary embodiment, the MMC 502 may dispose a command sequence 710 and a read buffer 720 in the buffer memory 510. The command sequence 710 is configured to store to-be-read data indicated by a read command and/or a first read command. The read buffer 720 is configured to store data read from the RNVM module 406. For example, the MMC 502 may read data from the RNVM module 406 according to at least one read command in the command sequence 710, and stores the read data in the read buffer 720. The read buffer 720 may store data normally read according to the read command and/or data pre-read using the pre-read operation. The target data in the read buffer 720 may be transmitted to the host system 11 in FIG. 1. The error data in the read buffer 720 may be discarded.

In an exemplary embodiment, the MMC 502 may obtain a total data amount of to-be-read data according to the first read command to be executed in the command sequence 710. For example, assuming that there are n first read commands to be executed in the command sequence 710, and each first read command is used to indicate that data of 4k bytes are to be read, the total data amount of the to-be-read data that can be obtained by the MMC 502 is 4k×n bytes. Alternatively, if each first read command is used to indicate that data of 8k bytes are to be read, the total data amount of the to-be-read data that can be obtained by the MMC 502 is 8k×n bytes, and so on.

In an exemplary embodiment, a data amount of to-be-read data indicated by a first read command is also referred to as a data length of the first read command. The MMC 502 may obtain the total data amount of the to-be-read data according to depth information of the command sequence 710 and information regarding the data length of the first read command. The depth information of the command sequence 710 can reflect a sequence depth of the current command sequence 710. The information regarding the data length of the first read command can reflect the data amount of the to-be-read data indicated by the first read command. For example, assuming that the sequence depth of the command sequence 710 is n, it indicates that there are n first read commands to be executed in the command sequence 710. If each first read command is used to indicate that data of 4k bytes are to be read, the total data amount of the to-be-read data that can be obtained by the MMC 502 is 4k×n bytes.

In an exemplary embodiment, the MMC 502 may obtain a logical value according to the depth information of the command sequence 710 and the information regarding the data length of the first read command. The logical value reflects the total data amount of the to-be-read data. For example, the MMC 502 may multiply the sequence depth (for example, n) of the command sequence 710 by the data length (for example, 4k bytes) of the first read command to obtain the logical value (for example, 12k bytes, 64k bytes, 512k bytes, or 1024k bytes).

Figure 8:
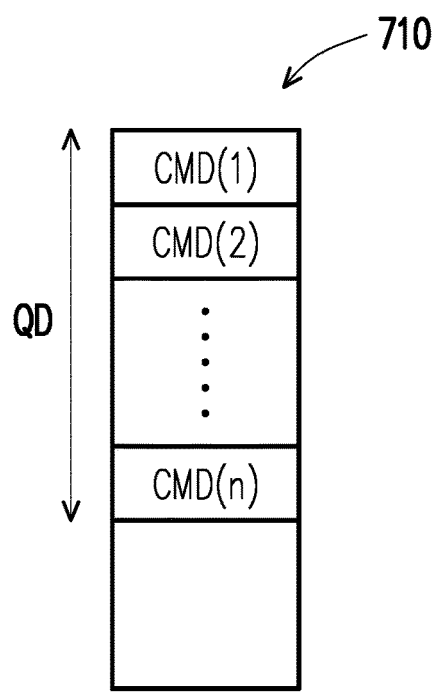
FIG. 8 is a schematic diagram illustrating a command sequence according to an exemplary embodiment of the disclosure.

FIG. 8 is a schematic diagram illustrating a command sequence according to an exemplary embodiment of the disclosure. Referring to FIG. 8, if read commands CMD(1) to CMD(n) are stored in the current command sequence 710, a sequence depth QD of the command sequence 710 may be determined as n. At different time points, if the value n changes, the sequence depth QD also changes.

In an exemplary embodiment, a data length of the read command CMD(1) may be different from a data length of CMD(n). For example, the data length of the read command CMD(1) is 4k bytes, and the data length of the read command CMD(n) is 8k bytes. In an exemplary embodiment, the MMC 502 may obtain the logical value (or the total data amount of the to-be-read data) according to one of the read commands CMD(1) to CMD(n) with the largest data length (for example, 8 kbytes). For example, the MMC 502 may multiply the sequence depth QD (for example, n) by 8k bytes to obtain the logical value (or the total data amount of the to-be-read data).

In an exemplary embodiment, the MMC 502 may compare the logical value to a threshold, and determine, based on a comparison result, whether to start the pre-read operation. For example, if the logical value is greater than the threshold, the MMC 502 may not start the pre-read operation. Alternatively, if the logical value is not greater than (for example, equal to or less than) the threshold, the MMC 502 may start the pre-read operation.

In an exemplary embodiment, the MMC 502 may determine the threshold based on a capacity of the read buffer 720 in FIG. 7. In other words, this threshold can reflect the capacity of the read buffer 720. For example, the MMC 502 may directly set the capacity of the read buffer 720 to the threshold. Alternatively, the MMC 502 may perform a logical operation on the capacity of the read buffer 720 to obtain the threshold.

In an exemplary embodiment, the MMC 502 may determine whether the total data amount of the to-be-read data in the command sequence 710 is greater than the capacity of the read buffer 720. If the total data amount is greater than the capacity of the read buffer 720, the MMC 502 may not start the pre-read operation, so as to avoid a reduction of data reading efficiency as a result of pre-reading excessive data. Alternatively, if the total data amount is not greater than the capacity of the read buffer 720, the MMC 502 may start the pre-read operation to improve data reading efficiency.

In an exemplary embodiment, after the depth information of the command sequence 710 is obtained, the MMC 502 may also determine whether the depth information meets a predetermined condition. If the depth information meets the predetermined condition, the MMC 502 can directly start the pre-read operation. In an exemplary embodiment, the predetermined condition may include that the sequence depth of the command sequence 710 is k (that is, there are k read commands to be processed in the command sequence 710, or there are k first read commands in total). If the sequence depth of the command sequence 710 is k, the MMC 502 can determine that the depth information meets the predetermined condition and directly start the pre-read operation. In an exemplary embodiment, if the sequence depth of the command sequence 710 is k, the pre-read operation can be directly started regardless of the data length of the first read command. In an exemplary embodiment, k is 1. In an exemplary embodiment, k may also be 2, 3, or other values.

In an exemplary embodiment, before whether to start the pre-read operation is determined, the MMC 502 may determine whether a plurality of executed read commands (a.k.a. second read commands) indicate a SRO. If the second read commands indicate a SRO, the MMC 502 can continue to determine whether to start the pre-read operation. Alternatively, if the second read commands do not indicate the SRO (for example, the second read commands indicate a random read operation), the MMC 502 may not proceed to determine whether to start the pre-read operation. In other words, in an exemplary embodiment, the foregoing operation of determining whether to start the pre-read operation is performed after determining that the second read commands indicate the SRO.

In an exemplary embodiment, the MMC 502 may determine whether the second read commands are used for reading a plurality of sequential LUs (a.k.a. second LUs). If the second read commands are used for reading the plurality of sequential second LUs, the MMC 502 may determine that the plurality of second read commands indicate the SRO. Alternatively, if the plurality of second read commands are not used for reading the plurality of sequential second LUs, the MMC 502 may determine that the plurality of second read commands do not indicate the SRO.

In an exemplary embodiment, there are p second LUs in total. In other words, if the MMC 502 detects that p sequential LUs are sequentially read, the MMC 502 can determine that the SRO is currently being performed and continues to determine whether to start the pre-read operation. If it is determined to start the pre-read operation, data stored in the first LU may be pre-read. The first LU may be sequentially arranged after the p sequential LUs. In an exemplary embodiment, p is 5. In an exemplary embodiment, p may also be 3, 6, or other values. In addition, if a read operation currently being performed is the random read operation, the MMC 502 can directly determine not to start the pre-read operation.

Figure 9:
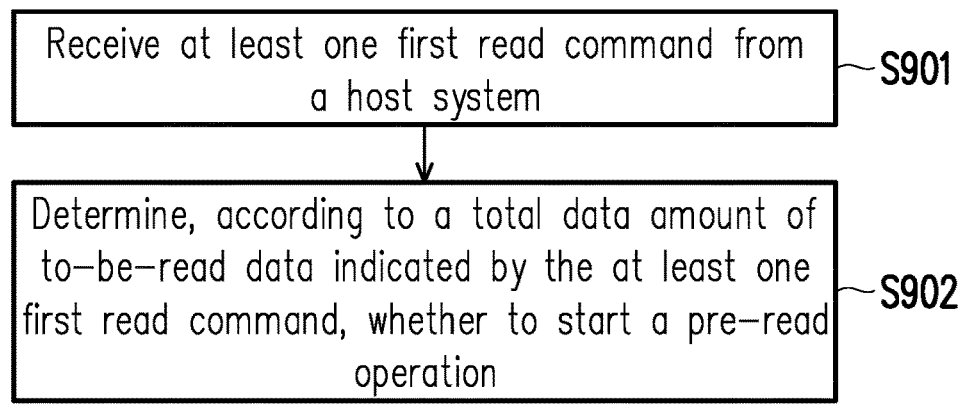
FIG. 9 is a flowchart illustrating a memory control method according to an exemplary embodiment of the disclosure.

FIG. 9 is a flowchart illustrating a memory control method according to an exemplary embodiment of the disclosure. Referring to FIG. 9, in step S901, at least one first read command is received from a host system. In step S902, whether to start a pre-read operation is determined according to a total data amount of to-be-read data indicated by the at least one first read command.

Figure 10:
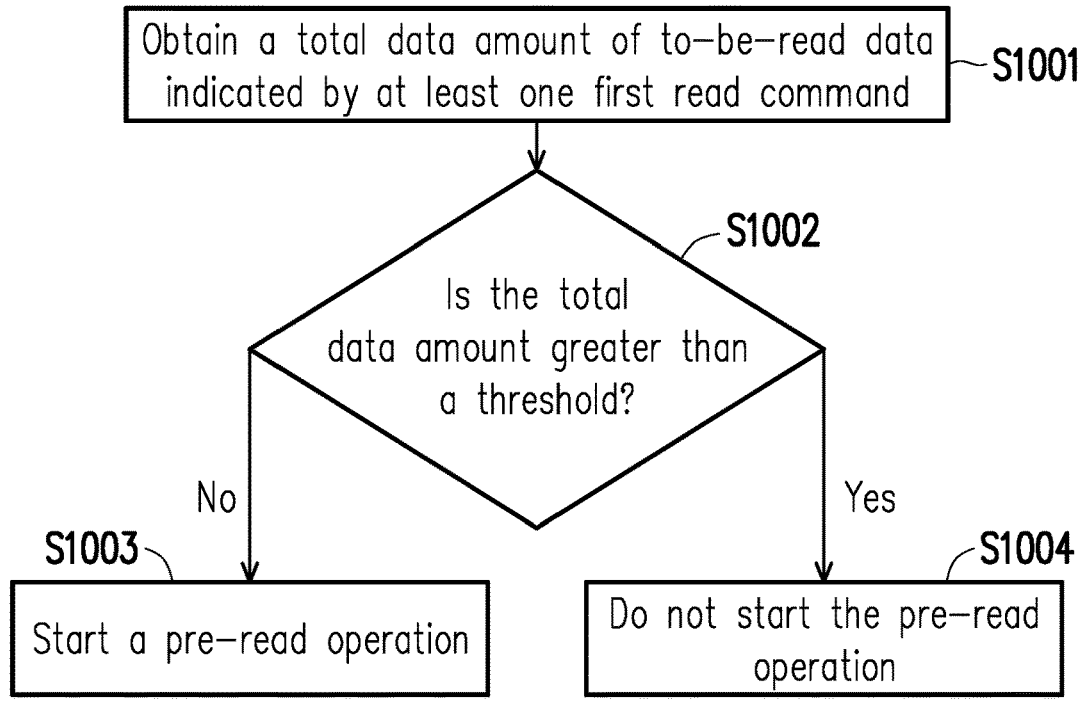
FIG. 10 is a flowchart illustrating a memory control method according to an exemplary embodiment of the disclosure.

FIG. 10 is a flowchart illustrating a memory control method according to an exemplary embodiment of the disclosure. Referring to FIG. 10, in step S1001, a total data amount of to-be-read data indicated by at least one first read command is obtained. In step S1002, whether the total data amount is greater than a threshold is determined. If the total data amount is not greater than the threshold, in step S1003, a pre-read operation is started to pre-read data stored in the first LU. However, if the total data amount is greater than the threshold, in step S1004, the pre-read operation is not started.

Figure 11:
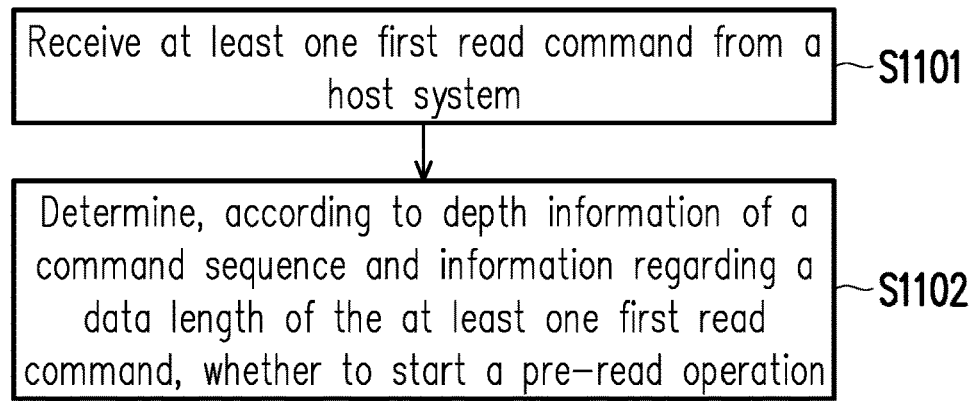
FIG. 11 is a flowchart illustrating a memory control method according to an exemplary embodiment of the disclosure.

FIG. 11 is a flowchart illustrating a memory control method according to an exemplary embodiment of the disclosure. Referring to FIG. 11, in step S1101, at least one first read command is received from a host system. In step S1102, whether to start a pre-read operation is determined according to depth information of a command sequence and information regarding a data length of the at least one first read command.

Figure 12:
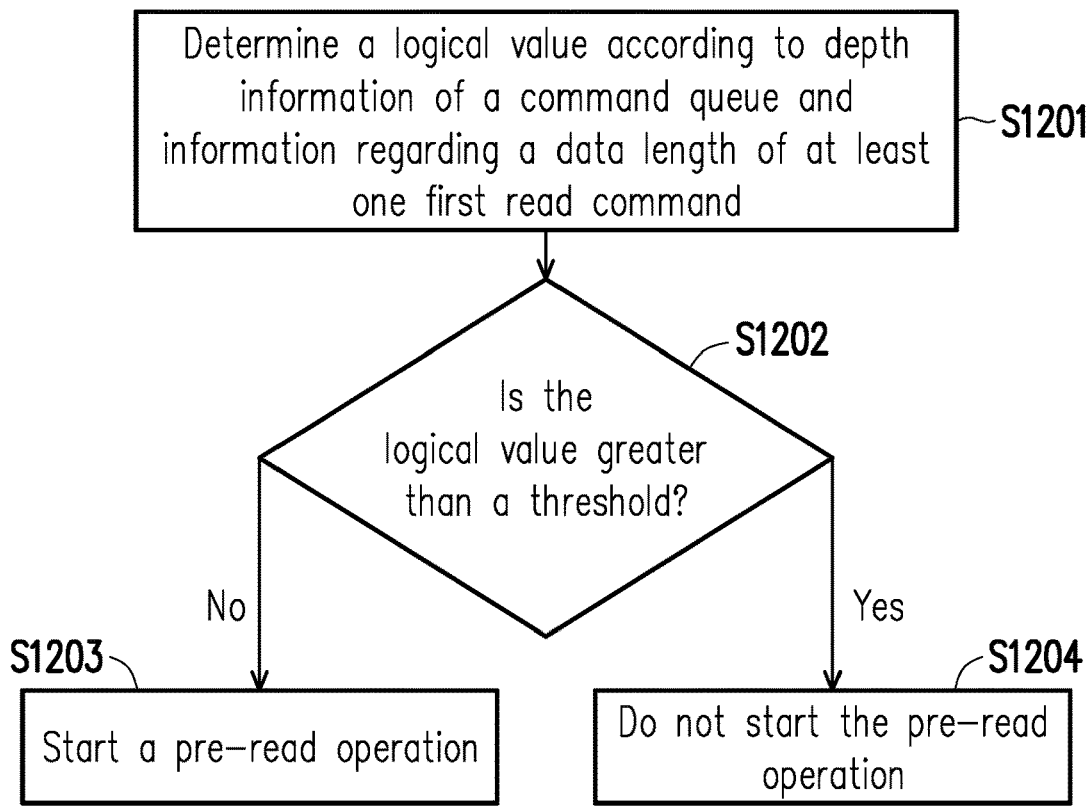
FIG. 12 is a flowchart illustrating a memory control method according to an exemplary embodiment of the disclosure.

FIG. 12 is a flowchart illustrating a memory control method according to an exemplary embodiment of the disclosure. Referring to FIG. 12, in step S1201, a logical value is determined according to depth information of a command sequence and information regarding a data length of at least one first read command. The logical value can reflect a total data amount of to-be-read data. In step S1102, whether the logical value is greater than a threshold is determined. If the logical value is not greater than the threshold, in step S1203, a pre-read operation is started. However, if the logical value is greater than the threshold, in step S1204, the pre-read operation is not started.

Figure 13:
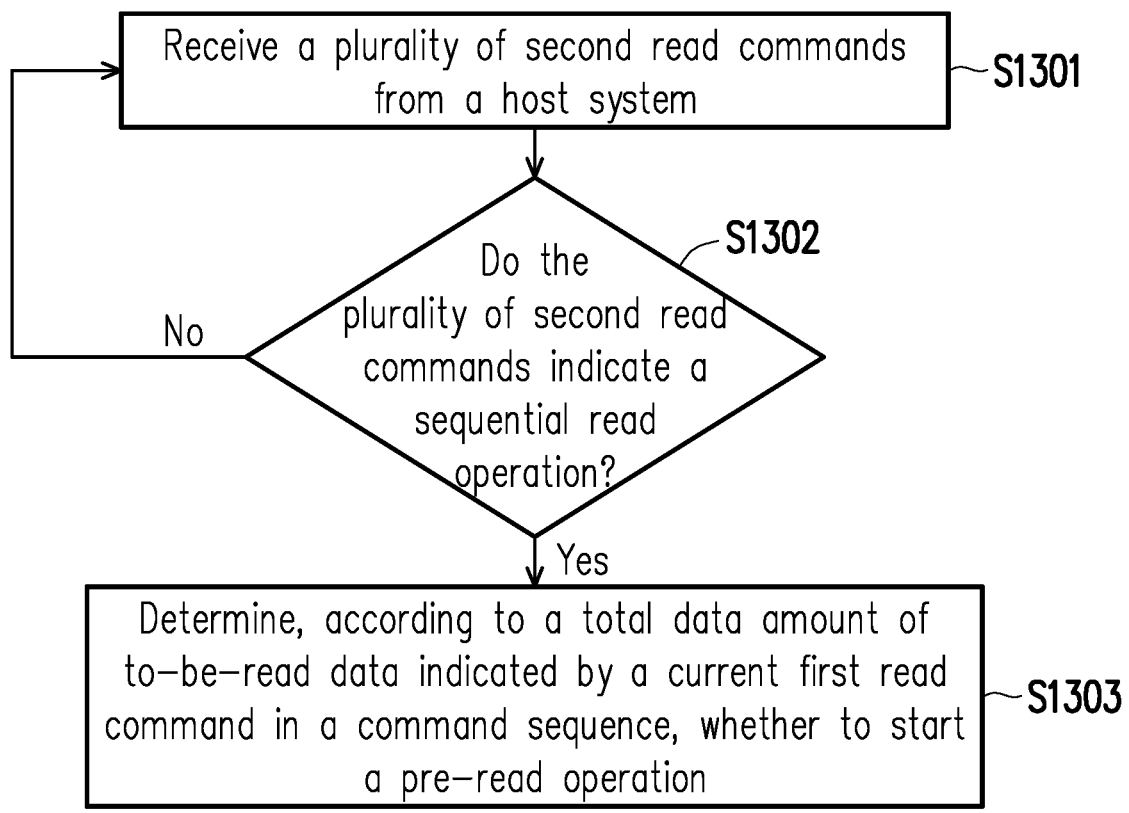
FIG. 13 is a flowchart illustrating a memory control method according to an exemplary embodiment of the disclosure.

FIG. 13 is a flowchart illustrating a memory control method according to an exemplary embodiment of the disclosure. Referring to FIG. 13, in step S1301, a plurality of second read commands are received from a host system. The plurality of second read commands may be executed. In step S1302, whether the plurality of second read commands indicate a SRO is determined. If the plurality of second read commands indicate a SRO (that is, a non-random read operation), in step S1303, whether to start a pre-read operation is determined according to a total data amount of to-be-read data indicated by a current first read command in a command sequence. However, if the plurality of second read commands do not indicate the SRO, step S1301 may be performed again to continue receiving and executing the second read command. It should be noted that, in an exemplary embodiment, step S1303 in FIG. 13 may be replaced by step S1102 in FIG. 11. The disclosure is not limited in this regard.

Nonetheless, the steps in FIG. 9 to FIG. 13 have been described in detail above, and therefore the descriptions thereof are omitted herein. It should be noted that the steps in FIG. 9 to FIG. 13 may be implemented as a plurality of program codes or circuits, which are not particularly limited by the disclosure. In addition, the methods of FIG. 9 to FIG. 13 may be used in combination with the foregoing exemplary embodiments, or may be used alone. The disclosure is not limited in this regard.

In summary, after determining that the SRO is currently being performed, in the exemplary embodiment of the disclosure, whether to start the pre-read operation may be determined according to a combination of the total data amount of the to-be-read data or the depth information of the command sequence and the information regarding the data length of the first read command. As a result, the data reading efficiency of the memory storage device can be effectively improved.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A memory control method for a rewritable non-volatile memory module, wherein the rewritable non-volatile memory module comprises a plurality of physical units, and the memory control method comprises:
   receiving at least one first read command from a host system;
   determining a threshold according to a capacity of a read buffer, wherein the read buffer is configured to temporarily store data read from the rewritable non-volatile memory module;
   determining whether a plurality of second read commands indicate a sequential read operation, wherein the plurality of second read commands is determined indicating the sequential read operation if the plurality of second read commands are configured for reading a plurality of sequential second logical units;
   comparing a total data amount of to-be-read data indicated by the at least one first read command to the threshold to generate a comparison result;
   determining, based on the comparison result, whether to start a pre-read operation if the plurality of second read commands are determined indicating the sequential read operation,
   wherein the pre-read operation is configured to pre-read data stored in at least one first logical unit, and the at least one first logical unit is mapped to at least one of the plurality of physical units; and
   starting the pre-read operation if the total data amount is not greater than the threshold.

2. The memory control method according to claim 1, wherein the step of determining, based on the comparison result, whether to start the pre-read operation comprises:
   skipping starting the pre-read operation if the total data amount is greater than the threshold.

3. The memory control method according to claim 1, further comprising:
   obtaining depth information of a command sequence; and
   starting the pre-read operation after determining that the depth information meets a predetermined condition.

4. A memory storage device, comprising:
   a connection interface unit coupled to a host system;
   a rewritable non-volatile memory module, wherein the rewritable non-volatile memory module comprises a plurality of physical units; and
   a memory control circuit unit coupled to the connection interface unit and the rewritable non-volatile memory module, wherein the memory control circuit unit is configured to receive at least one first read command from the host system,
   the memory control circuit unit is further configured to determine a threshold according to a capacity of a read buffer, wherein the read buffer is configured to temporarily store data read from the rewritable non-volatile memory module,
   the memory control circuit unit is further configured to determine whether a plurality of second read commands indicate a sequential read operation,
   wherein the plurality of second read commands is determined indicating the sequential read operation if the plurality of second read commands are configured for reading a plurality of sequential second logical units,
   the memory control circuit unit is further configured to compare a total data amount of to-be-read data indicated by the at least one first read command to the threshold to generate a comparison result, and
   the memory control circuit unit is further configured to determine, based on the comparison result, whether to start a pre-read operation if the plurality of second read commands are determined indicating the sequential read operation, wherein the pre-read operation is configured to pre-read data stored in at least one first logical unit, and the at least one first logical unit is mapped to at least one of the plurality of physical units; and starting the pre-read operation if the total data amount is not greater than the threshold.

5. The memory storage device according to claim 4, wherein the operation of determining, based on the comparison result, whether to start the pre-read operation comprises: skipping starting the pre-read operation if the total data amount is greater than the threshold.

6. The memory storage device according to claim 4, wherein the memory control circuit unit is further configured to obtain depth information of a command sequence, and the memory control circuit unit is further configured to start the pre-read operation after determining that the depth information meets a predetermined condition.

7. A memory control circuit unit for controlling a rewritable non-volatile memory module, wherein the rewritable non-volatile memory module comprises a plurality of physical units, and the memory control circuit unit comprises:

a host interface coupled to a host system;

a memory interface coupled to the rewritable non-volatile memory module; and a memory management circuit coupled to the host interface and the memory interface, wherein the memory management circuit is configured to receive at least one first read command from the host system, the memory management circuit is further configured to determine a threshold according to a capacity of a read buffer, wherein the read buffer is configured to temporarily store data read from the rewritable non-volatile memory module, the memory management circuit is further configured to determine whether a plurality of second read commands indicate a sequential read operation, wherein the plurality of second read commands is determined indicating the sequential read operation if the plurality of second read commands are configured for reading a plurality of sequential second logical units, the memory management circuit is further configured to compare a total data amount of to-be-read data indicated by the at least one first read command to the threshold to generate a comparison result, and the memory management circuit is further configured to determine, based on the comparison result, whether to start a pre-read operation if the plurality of second read commands are determined indicating the sequential read operation, wherein the pre-read operation is configured to pre-read data stored in at least one first logical unit, and the at least one first logical unit is mapped to at least one of the plurality of physical units; and starting the pre-read operation if the total data amount is not greater than the threshold.

8. The memory control circuit unit according to claim 7, wherein the operation of determining, based on the comparison result, whether to start the pre-read operation comprises: skipping starting the pre-read operation if the total data amount is greater than the threshold.

9. The memory control circuit unit according to claim 7, wherein the memory management circuit is further configured to obtain depth information of a command sequence, and the memory management circuit is further configured to start the pre-read operation after determining that the depth information meets a predetermined condition.

10. A memory control method for a rewritable non-volatile memory module, wherein the rewritable non-volatile memory module comprises a plurality of physical units, and the memory control method comprises:

receiving at least one first read command from a host system;

determining a threshold according to a capacity of a read buffer, wherein the read buffer is configured to temporarily store data read from the rewritable non-volatile memory module;

determining a logical value according to depth information of a command sequence and information regarding a data length of the at least one first read command, wherein the logical value reflects a total amount of to-be-read data indicated by the at least one first read command;

comparing the logical value to the threshold to generate a comparison result; and determining, based on the comparison result, whether to start a pre-read operation, wherein the pre-read operation is configured to pre-read data stored in at least one first logical unit, and the at least one first logical unit is mapped to at least one of the plurality of physical units, and starting the pre-read operation if the total data amount is not greater than the threshold.

* * * * *